United States Patent
Curtis (10) Patent No.: US 7,475,260 B2
(45) Date of Patent: Jan. 6, 2009

(54) METHOD AND APPARATUS FOR PROTECTING SENSITIVE INFORMATION IN A LOG FILE

(75) Inventor: Bryce Allen Curtis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 10/142,615

(22) Filed: May 9, 2002

(65) Prior Publication Data

US 2003/0212899 A1 Nov. 13, 2003

(51) Int. Cl.
*G06F 9/00* (2006.01)
*G06F 9/312* (2006.01)

(52) U.S. Cl. .................. 713/193; 713/190; 713/189; 726/5; 726/18

(58) Field of Classification Search ............... 713/193, 713/173, 190, 194; 726/5, 18
See application file for complete search history.

(56) References Cited

U.S. PATENT DOCUMENTS

| | | | |
|---|---|---|---|
| 4,757,533 A | 7/1988 | Allen et al. ............ 380/25 |
| 5,237,614 A | 8/1993 | Weiss ................. 380/23 |
| 5,592,549 A * | 1/1997 | Nagel et al. ............ 705/52 |
| 5,740,432 A | 4/1998 | Mastors ............... 395/618 |
| 5,832,518 A | 11/1998 | Mastors ............... 707/202 |
| 5,890,154 A | 3/1999 | Hsiao et al. ............ 707/8 |
| 5,892,917 A | 4/1999 | Myerson ............ 395/200.54 |
| 5,978,475 A * | 11/1999 | Schneier et al. ........ 713/177 |
| 5,991,753 A | 11/1999 | Wilde ................. 707/2 |
| 6,018,583 A | 1/2000 | Hawthorne ........... 380/49 |
| 6,081,893 A | 6/2000 | Grawrock et al. ........ 713/183 |
| 6,092,087 A | 7/2000 | Mastors ............... 707/202 |
| 6,104,995 A * | 8/2000 | Shimada et al. ......... 704/270 |
| 6,339,828 B1 | 1/2002 | Grawrock et al. ........ 713/183 |
| 6,571,218 B1 * | 5/2003 | Sadler ................ 705/16 |
| 6,571,336 B1 * | 5/2003 | Smith, Jr. .............. 713/184 |
| 6,681,214 B1 * | 1/2004 | Doljack ............... 705/75 |
| 2003/0105958 A1* | 6/2003 | McArdle .............. 713/167 |
| 2003/0187925 A1* | 10/2003 | Inala et al. ............ 709/204 |
| 2004/0068692 A1* | 4/2004 | Cho et al. ............. 715/500 |
| 2004/0098640 A1* | 5/2004 | Smith ................. 714/39 |

(Continued)

OTHER PUBLICATIONS

Christian Spieler, ZIP_CLI.HELP, Dec. 5, 1995 pp. 1-11.*

(Continued)

*Primary Examiner*—Nasser G Moazzami
*Assistant Examiner*—Eleni A Shiferaw
(74) *Attorney, Agent, or Firm*—Duke W. Yee; Libby Z. Handelsman; Wayne P. Bailey (57) ABSTRACT

A method, apparatus, and computer instructions for protecting sensitive data in a log file. Data is logged into a file. The data in the log file is in a protected state and the data is never written to the log file in an unprotected fashion. Prior to the data being logged into the file, the data is parsed for specific data meeting predetermined criteria. The specific data is selectively protected with a security measure while leaving a remainder of the log file unprotected by the security measure. The viewer or program used to access the data in the log file is responsible for unprotecting or allowing the data to be viewed if the appropriate key is provided.

6 Claims, 6 Drawing Sheets

U.S. PATENT DOCUMENTS

2005/0149854 A1* 7/2005 Pennell et al. .............. 715/507

OTHER PUBLICATIONS

Christian Spieler, ZIP_CLI.HELP, Dec. 5, 1995 pp. 1-11.*
James Gish, Salting The Password, Apr. 1985, pp. 88-89.*
Cisco CRM temporary file vulnerability Aug. 19, 1998, I-086.5 pages.*
Gish, "Salting the Password", Infosystems, vol. 32, No. 4, pp. 88-89, Apr. 1985, Abstract.

* cited by examiner

```
      ┌ Installation started.
      │ Creating user NEWUSER with password <protect>ab3ea</protect>.
600 ──┤                                    602              604          606
      │ Files copied.                              608
      └ Installation successful.
```

FIG. 6A

```
      ┌ Installation started.
      │ Creating user NEWUSER with password <encrypted>eijwld</encrypted>.
600 ──┤                                    612                614
      │ Files copied.                              610
      └ Installation successful.
```

```
/**
*This class writes a log message to the screen and/or file
*/
public class Log {

//The log file name to write log messages to
    String logFile="log";

//Flag that indicates logging to screen is enabled
    boolean logToScreen=true;

//Flag that indicates logging to file is enabled
    boolean logToFile=true;

/**
    *Log a text message
    *
    *@param text The text message to log.
    */
    public void log (String text) {
        if (logToScreen) {
            //write the text message to the screen
        }
        if (logToFile) {
            //write the text message to the log file
        }
    }
}
```

*FIG. 9A*

```
                                            902 private Vector hideString=new Vector();

/**
*When logging, don't show the string as part of the text. This
*is used to hide a password that may be logged.
*
*@param s the string to hide.
*/
public static void setHideString(String s) {
   hideString.addElement(s);
}
```

FIG. 9B

```
                                            904 public void log(String text) {
   String newText=text;
   for (int i=0; i<hideString.size(); i++) {
      newText=Substitute(newText, hideString.elementAt(i), "****");
   }                                                          \
   if (logToScreen) {                                          906
      //write the newText message to the screen
   }
   if (logToFile) {
      //write the newText message to the log file
   }
}
```

FIG. 9C

METHOD AND APPARATUS FOR PROTECTING SENSITIVE INFORMATION IN A LOG FILE

BACKGROUND OF THE INVENTION

1. Technical Field

The present invention relates generally to an improved data processing system, and in particular, to a method and apparatus for processing data. Still more particularly, the present invention provides a method and apparatus for protecting selected text and other information generated during the creation of a log file.

2. Description of Related Art

Data processing systems are widely used in both home and business settings. Data processing systems are used for all sorts of tasks including generation of documents, databases, e-mail, and spreadsheets. These tasks are accomplished by executing a program or application. When a new task is to be performed, a new application may be installed on a data processing system. Also, an application may be upgraded to enable a user to perform new tasks or perform existing tasks more efficiently.

In installing an application or upgrading an application, an installation program is often used to simplify the process. The installation program is also referred to as a "setup program". This program is one that prepares an application or software package to run on the data processing system. The installation program will create a folder with a default name on the hard disk and copy the files from the distribution CD-ROM or diskettes to that folder. Files are typically compressed on the distribution medium, and the install program decompresses them into their original format.

During this installation process, log files are often created that list status messages, information, and errors occurring during the process. These types of files are typically text files. Additionally, this information also may be displayed during the installation process. In some cases, these log files may contain sensitive or confidential information, such as a user ID or password, that is needed by the installation program. As a result, access to these types of files may be undesirable when they contain confidential information. Also, in many cases a user does not know what information is actually logged or saved in the file.

Therefore, it would be advantageous to have an improved method, apparatus, and computer instructions for protecting sensitive or confidential information during a logging process.

SUMMARY OF THE INVENTION

The present invention provides a method, apparatus, and computer instructions for protecting sensitive data in a log file. Data is logged into a file. The data in the log file is in a protected state and the data is never written to the log file in an unprotected fashion. Prior to the data being logged into the file, the data is parsed for specific data meeting predetermined criteria. The specific data is selectively protected with a security measure while leaving a remainder of the log file unprotected by the security measure. The viewer or program used to access the data in the log file is responsible for unprotecting or allowing the data to be viewed if the appropriate key is provided.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
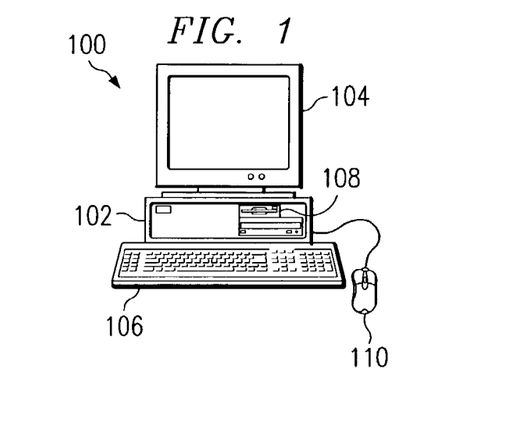
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM e-Server computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
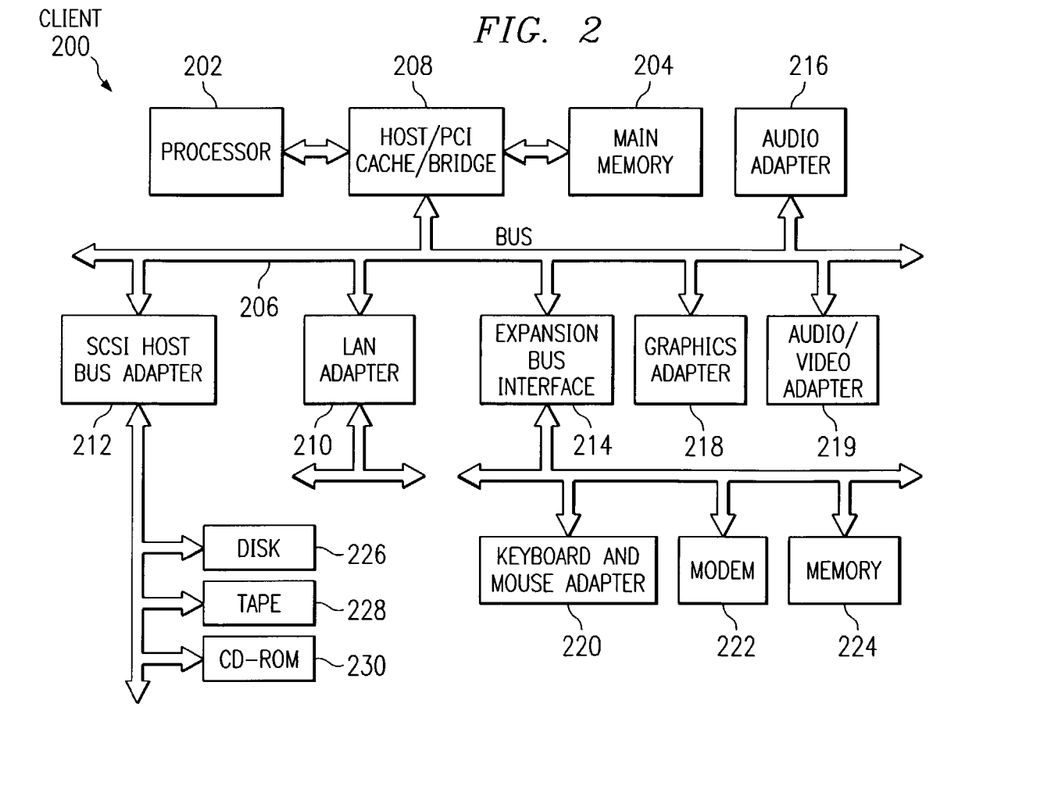
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM) or equivalent nonvolatile memory or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices, such as hard disk drive 226, tape drive 228 or CD-ROM 230.

Figure 3:
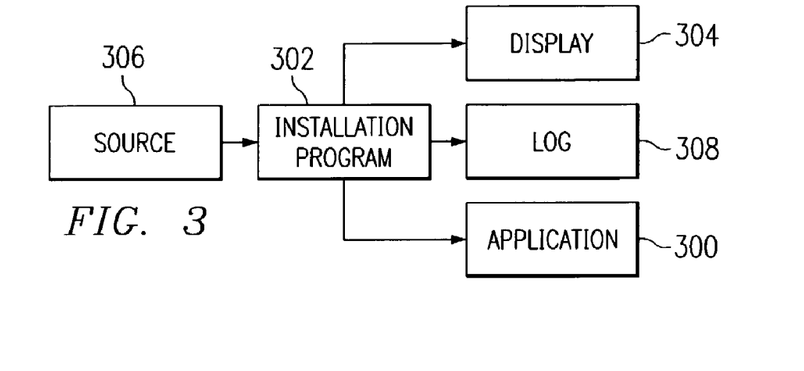
FIG. 3 is a diagram of components used in installing an application or program in accordance with a preferred embodiment of the present invention.

With reference next to FIG. 3, a diagram of components used in installing an application or program is depicted in accordance with a preferred embodiment of the present invention. In this example, application 300 is installed onto a data processing system, such as data processing system 200 in FIG. 2, using installation program 302. Installation program 302 is a typical installation process, which is implemented using the Java programming language. Installation program 302 allows a user to install a program through a simple user interface. This user interface is displayed on display 304. The interface in installation program 302 may allow a user to select typical or default installation parameters or allow the user to customize them. Installation program 302 is also referred to as a "setup" program.

In these examples, installation program 302 obtains and decompresses code from source 306, which may be, for example, a CD-ROM or a server computer. As part of the installation process, log 308 is generated. This log contains information, such as status messages, transaction details, and errors that may occur during installation of application 300.

As illustrated, installation program 302 includes a mechanism to identify and protect sensitive or confidential information. Information that may be selected for protection includes, for example, user IDs, passwords, Internet Protocol (IP) addresses, and digital signatures. Installation program 302, replaces, removes, or encrypts the information to prevent unauthorized viewing of this information by another person or process. For example, installation program 302 may remove the sensitive information from the message or text that is to be stored in log 308. Alternatively, sensitive text may be replaced with other text or an encrypted value. This same mechanism also prevents the viewing of this information in the event that information being logged is displayed on display 304.

Logging also may occur with other types of programs or applications other than an installation program. A network monitor used to monitor network traffic on a local area network and an intrusion detection program are other types of programs in which logging may occur. For example, an intrusion detection program may log unauthorized attempts to log on to a network or unauthorized attempts to access protected ports on a server.

Figure 4:
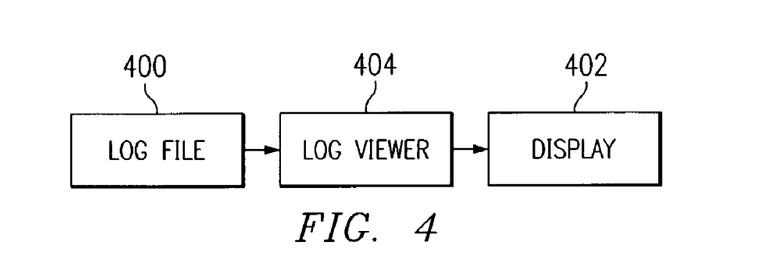
FIG. 4 is a diagram of components used to view information in a log file in accordance with a preferred embodiment of the present invention.

Turning now to FIG. 4, a diagram of components used to view information in a log file is depicted in accordance with a preferred embodiment of the present invention. Log file 400 may be viewed on display 402 through log viewer 404. In some cases, log viewer 404 may be as simple as a word processing system. Of course, other types of log viewers may be used other than a word processing program. For example, a log viewer may be a function or program integrated with another program, such as an intrusion detection program in which the log viewer only provides the capability to handle ASCII text and does not include various types of manipulation features found in word processors.

In the event that information has been encrypted within log file 400, log viewer 404 may include a password or key mechanism to allow authorized viewers to view this information on display 402. For example, a company installing applications on computers may only allow its information technology (IT) department to view passwords or digital signatures while preventing other users from being able to view this information. In this case, the information may be encrypted such that the IT department is able to view this information by supplying the appropriate key or password to log viewer 404.

Figure 5A:
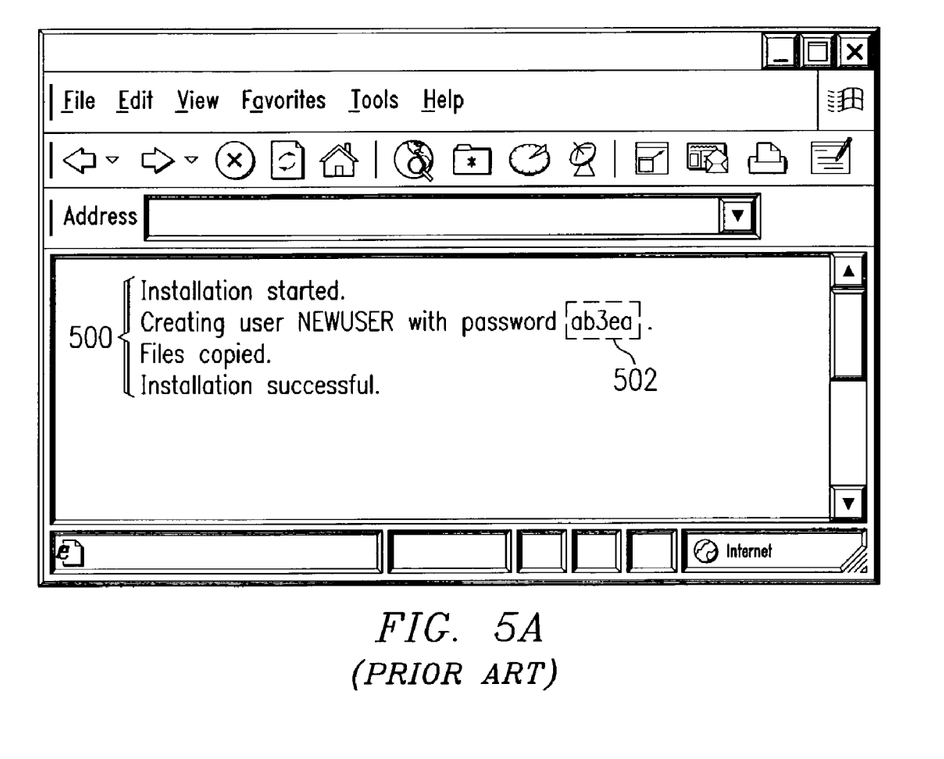
FIG. 5A is a diagram of a display of log information.
Figure 5B:
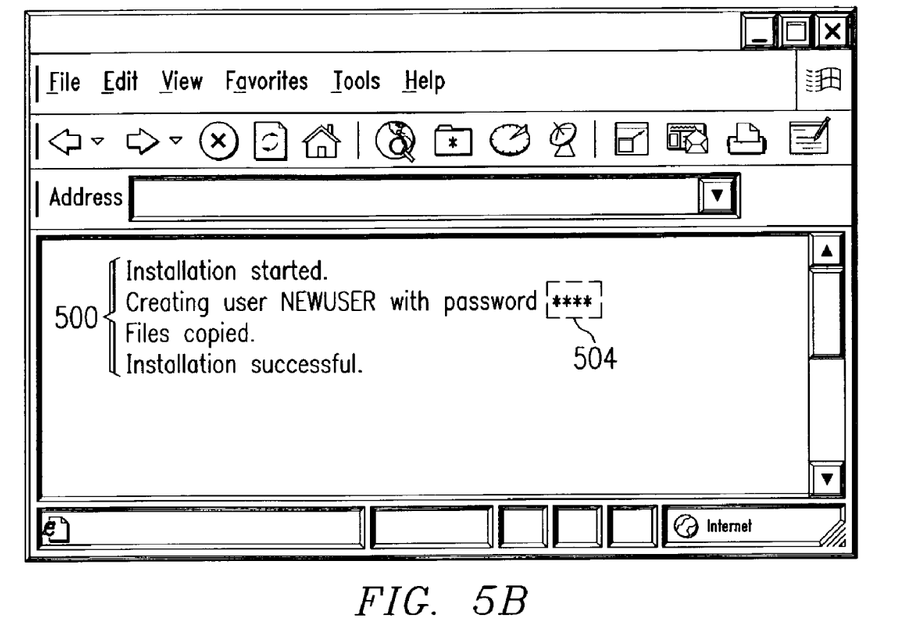
FIG. 5B is a diagram of a display of log information with protected information in accordance with a preferred embodiment of the present invention.

With reference now to FIG. 5A, a diagram of a display of log information is depicted. In FIG. 5B, a diagram of a display of log information with protected information is depicted in accordance with a preferred embodiment of the present invention. First in FIG. 5A, log information in section 500 includes a display of password 502, which is considered sensitive or confidential information. By using the mechanism of the present invention, password 502 in FIG. 5A is replaced with text 504 in FIG. 5B. In this particular case, text 504 is a series of "*'s", replacing password 502.

Figure 6A:
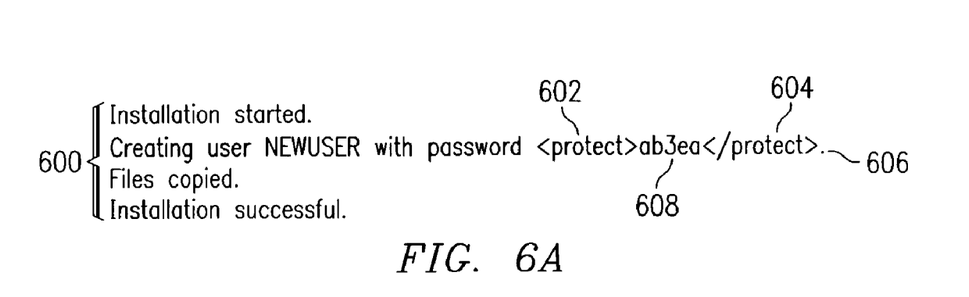
FIG. 6A is a diagram of identifiers used to identify sensitive information in accordance with a preferred embodiment of the present invention.

With reference next to FIG. 6A, a diagram of identifiers used to identify sensitive information is depicted in accordance with a preferred embodiment of the present invention. Log information 600 includes tags 602 and 604 in line 606. These tags are placed around information that is to be protected. As illustrated, tag 602 and tag 604 are placed around password 608. These tags may be inserted by installation program 302 based on the location of this information or based on pre-identified types of parameters or variables depending on the particular implementation. For example, sensitive information may be identified by matching text to a list of words or text that has been identified as information that should be protected. Sensitive information is known by the install program. Some programs may know whether information is sensitive information by the context. For example, an install program knows that it asked for a password. The program knows that the input to this prompt is a password. The install program has the password stored in an internal variable and knows where the password is used, such as a command line option, a parameter of a system call, etc.

Before logging a message that displays the password, the developer of the install program has determined that the password will be logged or shown and knows where within the message that the password will be located. Consider the following:

printToLog("Password used for account"+user+"is"+ password).

The developer knows that the password is about to be logged, so the password is surrounded with a tag, such as shown below:

printToLog("Password used for account"+user+"is <protect>"+password+"</protect>").

Thus, the password is selectively protected by the mechanism of the present invention.

Figure 6B:
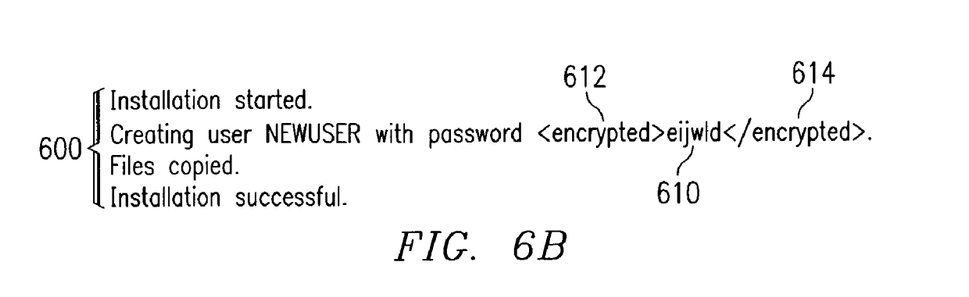
FIG. 6B is a diagram illustrating protected information in a log file in accordance with a preferred embodiment of the present invention.

Turning next to FIG. 6B, a diagram illustrating protected information in a log file is depicted in accordance with a preferred embodiment of the present invention. When tags 602 and 604 are encountered, password 608 is encrypted and replaced with encrypted text 610. Further, tag 612 and tag 614 are placed around encrypted text 610 to identify that this text is encrypted text. Later, an authorized user with the appropriate key or password may decrypt encrypted text 610 for viewing. Tags 612 and 614 serve to allow the process that is used to decrypt the sensitive information to locate the text that may be decrypted when an authorized user views log information 600.

Although the tags and delimiters used in this example are <protect> and <encrypt>, a variety of tags or delimiters may be used depending on the particular implementation.

Of course, other types of protection other than encryption may be used. For example, the sensitive text may be removed from the message itself or may be replaced with other types of text such as a "*" or a "#". In another example, text may be replaced with pointers in which the pointers are password protected or with pointers to a protected database.

Figure 7:
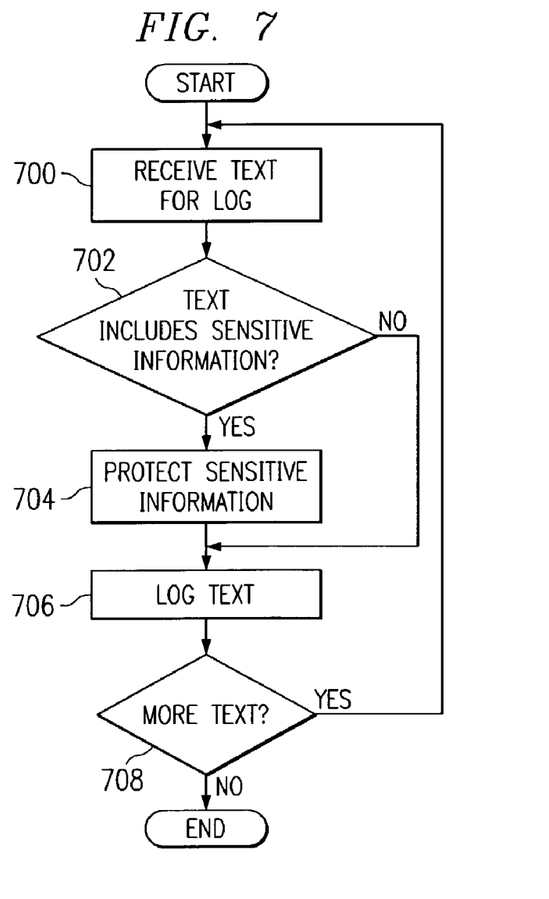
FIG. 7 is a flowchart of a process used to protect information in a log file in accordance with a preferred embodiment of the present invention.

With reference now to FIG. 7, a flowchart of a process used to protect information in a log file is depicted in accordance with a preferred embodiment of the present invention. The process illustrated in FIG. 7 may be implemented in an installation process, such as installation program 302 in FIG. 3.

The process begins by receiving text for the log (step 700). A determination is made as to whether the text includes sensitive information (step 702). Step 702 may be performed by searching for tags or by matching text to a list of words or text. If the text includes sensitive information, the sensitive information is protected (step 704). Step 704 may be performed using various methods. For example, the text may be protected through an encryption process, by removing the text, or by replacing the text with nonsensitive or nonconfidential information.

Thereafter, the text is logged or stored in a file (step 706). Next, a determination is made as to whether more text is present (step 708). If more text is not present, the process terminates.

Referring again to step 708, if more text is present, the process returns to step 700 as described above. With reference again to step 702, if the text does not includes sensitive information, the process proceeds to step 706 as described above.

In these examples, the logging process occurs as part of an installation of a program. Logging also may occur with other actions. For example, an event handler in a network monitoring program may generate text for a log.

Figure 8:
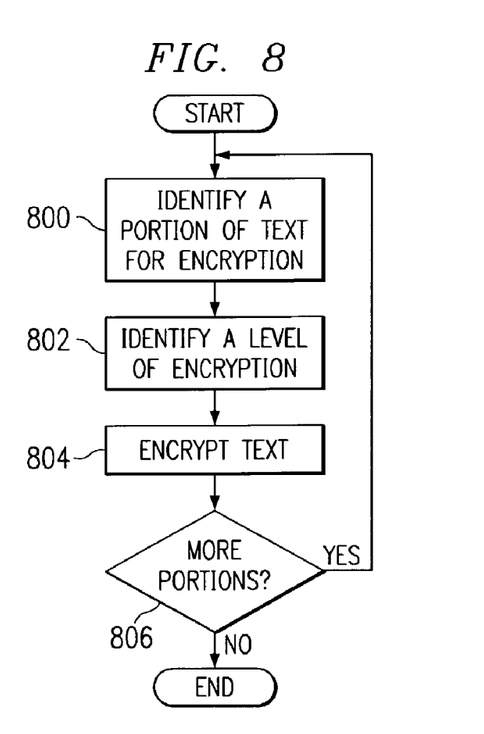
FIG. 8 is a diagram illustrating an encryption process in accordance with a preferred embodiment of the present invention.

Turning next to FIG. 8, a diagram illustrating an encryption process is depicted in accordance with a preferred embodiment of the present invention. This process may be performed by an installation program, such as installation program 302 in FIG. 3. Specifically, the process illustrated in FIG. 8 is a more detailed description of one way to implement step 704 in FIG. 7.

The process begins by identifying a portion of text for encryption (step 800). The portion of text processed in step 800 may be a single word or multiple lines of text depending on the logging process. Thereafter, a level of encryption is identified (step 802). Multiple levels of encryption may occur in which different keys or passwords are generated such that different portions of the protected information may be viewed depending on the particular key or password used. In some cases, only a portion of the information may be viewed, while in other cases, all of the information may be viewed. Based on the level of encryption identified, the text is then encrypted (step 804).

Next, a determination is made as to whether more portions of text are present for encryption (step 806). If additional portions are present, the process returns to step 800. Otherwise, the process terminates.

Figure 9A:
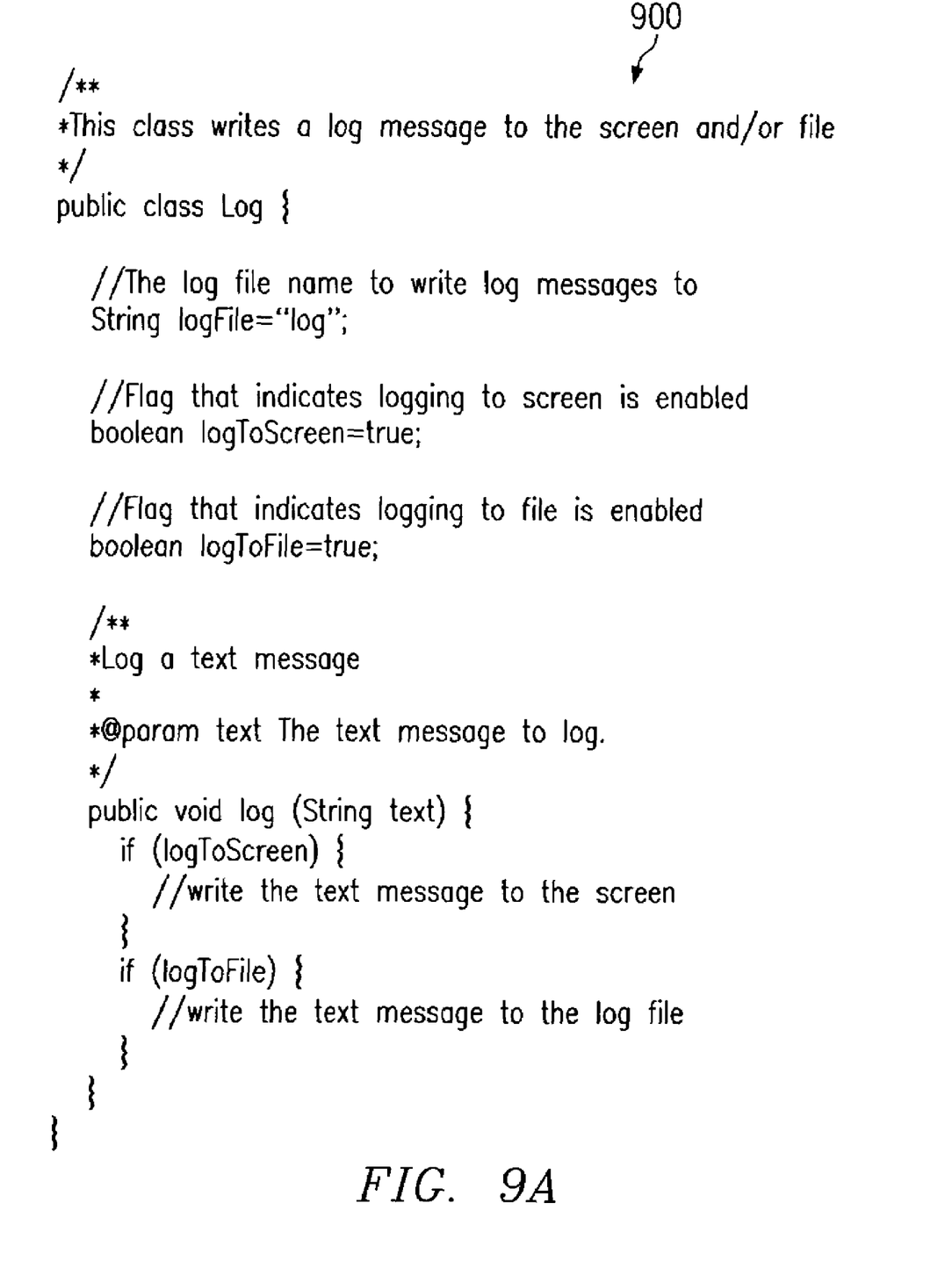
FIGS. 9A-9C are diagrams illustrating codes used to log and protect text in accordance with a preferred embodiment of the present invention.
Figure 9B:
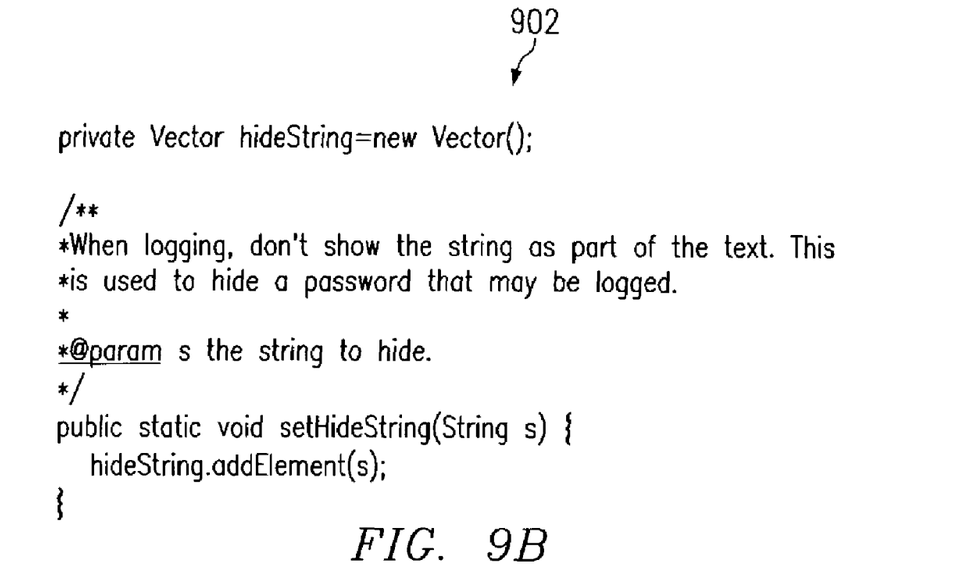
Figure 9C:
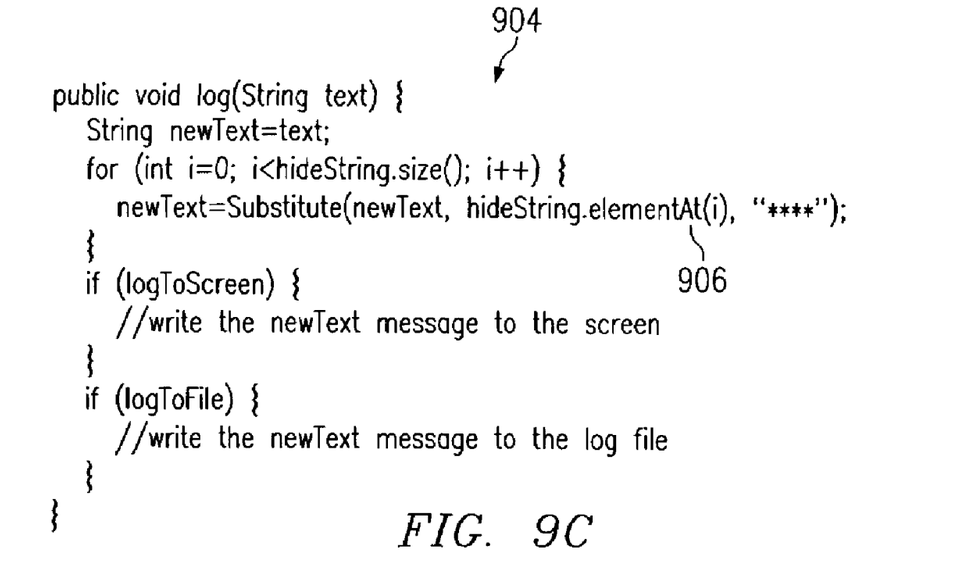

With reference now to FIGS. 9A-9C, diagrams illustrating codes used to log and protect text are depicted in accordance with a preferred embodiment of the present invention. In FIG. 9A, object 900 receives a text message and is capable of displaying the message or saving it to a data file. In FIG. 9B, method 902 may be used with object 900 to prevent the viewing of sensitive or confidential information. This particular method, method 902, hides or removes the information from the log. Method 902 allows for a string to be hidden such that no other class may read this string. This mechanism allows for one or more strings to be hidden by saving all of the hidden strings in a vector. The hidden strings may include, for example, any text, including parts of a word, one or more words, sentences, numbers, or any combination thereof.

In FIG. 9C, method 904 is used to remove and replace sensitive information. As can be seen in this example, line 906 causes the sensitive information to be replaced with "**". Method 904 also may be written such that an empty string replaces the protected text rather than a "**".

Thus, the present invention provides an improved method, apparatus, and computer implemented instructions for protecting sensitive information. The mechanism prevents the viewing of this information through various schemes, such as encryption or replacement as described above. Any scheme that prevents information from being viewed or used by an unauthorized person or process may be used with the mechanism of the present invention. In this manner, information that is to be protected may be protected during the generation of logs.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for protecting sensitive data in a log file, the method comprising the computer implemented steps of:
    logging data into the log file;
    parsing the data to identify specific data meeting predetermined criteria, the specific data being a subset of the data; and
    selectively protecting the specific data logged in the log file with a security measure stored in the log file while leaving a remainder of the log file unprotected by the security measure, wherein the selectively protecting step comprises preventing a display on a display device of the specific data logged in the log file using the security measure stored in the log file during display of the log file, while the remainder of the log file is displayed on the display device, wherein the selectively protecting step comprises:
    encrypting the specific data to form encrypted data while the remainder of the log file is unencrypted.

2. The method of claim 1, wherein the selectively protecting step further comprises:
    preventing a display of the encrypted data in an unencrypted form if a key to decrypt the data is absent when displaying the log file.

3. A data processing system for protecting sensitive data in a log file, the system comprising a processor to perform the computer implemented steps of:
    logging means for logging data into the log file;
    parsing means for parsing the data to identify specific data meeting predetermined criteria, the specific data being a subset of the data; and
    protecting means for selectively protecting the specific data logged in the log file with a security measure stored in the log file while leaving a remainder of the log file unprotected by the security measure, wherein the selectively protecting means comprises preventing means for preventing a display on a display device of the specific data logged in the log file using the security measure stored in the log file during display of the log file, while the remainder of the log file is displayed on the display device, wherein the selectively protecting means comprises:
    encrypting means for encrypting the specific data to form encrypted data while the remainder of the log file is unencrypted.

4. The data processing system of claim 3, wherein the preventing means is a first prevention means and wherein the selectively protecting means further includes:
    second preventing means for preventing a display of the encrypted data in an unencrypted form if a key to decrypt the data is absent when displaying the log file.

5. A computer program product stored in a computer readable medium for protecting sensitive data in a log file, the computer program product comprising:
    first instructions for logging data into the log file;
    second instructions for parsing the data to identify specific data meeting predetermined criteria, the specific data being a subset of the data; and
    third instructions for selectively protecting the specific data logged in the log file with a security measure stored in the log file while leaving a remainder of the log file unprotected by the security measure, wherein the third instructions comprise sub-instructions for preventing a display on a display device of the specific data logged in the log file using the security measure stored in the log file during display of the log file, while the remainder of the log file is displayed on the display device, wherein the third instructions comprise:
    sub-instructions for encrypting the specific data to form encrypted data while the remainder of the log file is unencrypted.

6. The computer program product of claim 5, wherein the third instructions further comprise:
    sub-instructions for preventing a display of the encrypted data in an unencrypted form if a key to decrypt the data is absent when displaying the log file.

* * * * *